United States Patent Office 3,739,055
Patented June 12, 1973

3,739,055
METHOD FOR HEAT TREATING POLYAMIDE FIBERS
Toshiyuki Ueda and Takuji Fukuda, Tokyo, Japan, assignors to Bridgestone Tire Company Limited, Tokyo, Japan
Filed Aug. 19, 1970, Ser. No. 65,094
Claims priority, application Japan, Aug. 26, 1969, 44/67,047
Int. Cl. B29c 25/00
U.S. Cl. 264—342 RE
1 Claim

ABSTRACT OF THE DISCLOSURE

Polyamide fibers are stabilized against heat and stress by subjecting the fibers to a heat treatment at a high temperature for a given time under a high tension and then to a heat treatment at a high temperature for a given time under a low tension alternately repeatedly at least 3 times. These polyamide fibers are used for reinforcing elastic materials, particularly for tyre cord.

---

Figure 1:
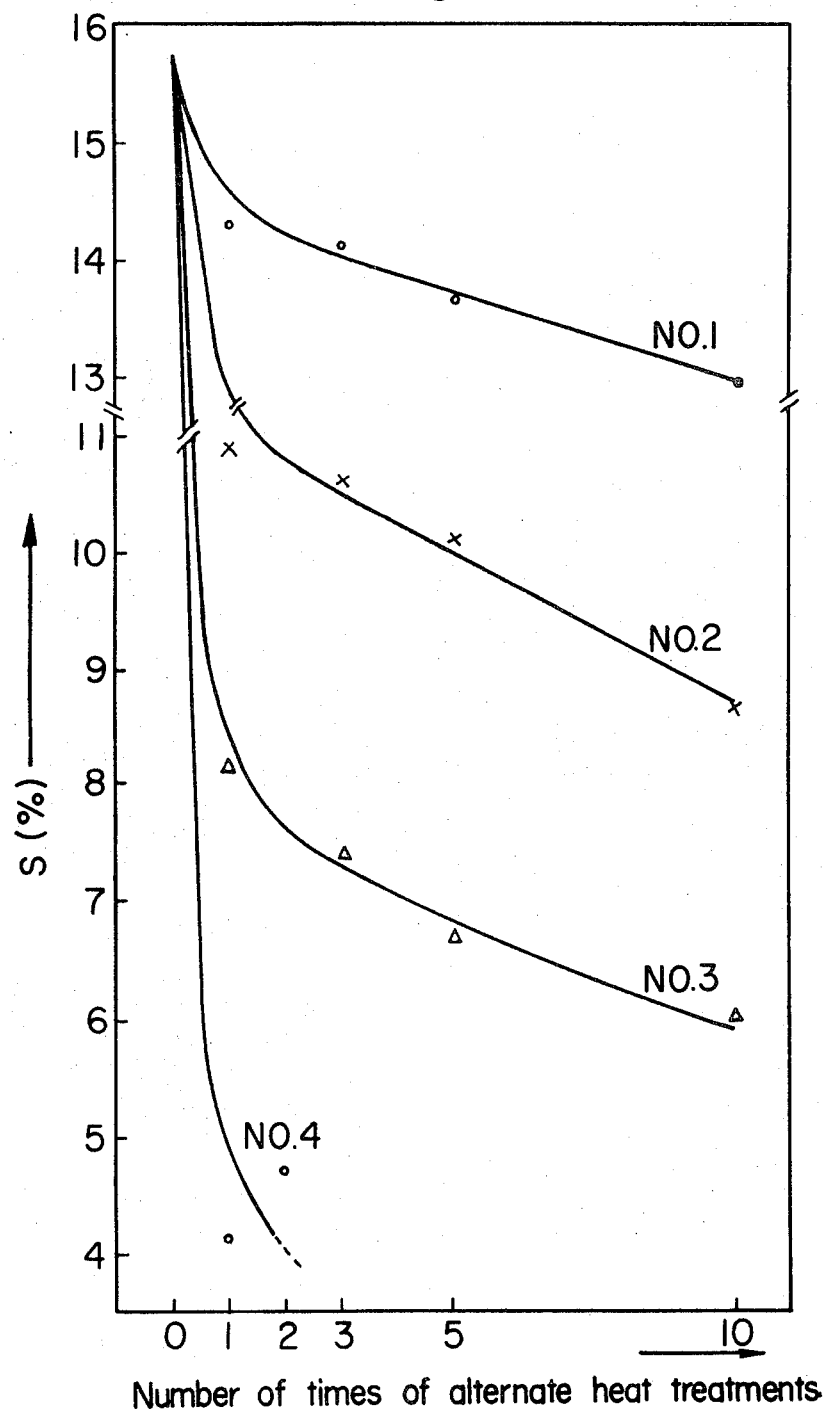

The present invention relates to a method for heat treating polyamide fibers in order to stabilize polyamide fibers against heat and stress, particularly, to a method for heat treating nylon-6.

Polyamide fibers, particularly nylon-6 have excellent physical properties, such as tensile strength, bending strength, abrasion resistance and the like, so that they are suitable for cords to be used for reinforcing elastic materials, particularly for tyre cord. On the other hand, these fibers are very larger in shrinkage owing to raising of temperature or extension owing to stress than other fibers such as rayon, polyester and the like and therefore an uneven shrinkage resulting from temperature variation or an uneven extension resulting from a slight stress variation is liable to be caused and consequently, the dimension and elasticity of the product become ununiform. In elastic products reinforced with these fibers, particularly, a tyre, the structure varies sensitively owing to variation of heat and stress during production of the tyre and uniformity of dimension and elasticity (referred to as "uniformity" hereinafter) and uniformity of dimension between products when the products having the same size are observed collectively (referred to as "dimension stability" hereinafter) are poor and these make the production of the tyre very difficult, disturb the smooth running of tyre and increase the noise and give an unpleasant feeling to drivers.

Accordingly, an improvement of the dimension stability of polyamide fibers, particularly, nylon-6 has heretofore been a very important problem for those skilled in the art and a large number of investigations have been made for such an improvement. For example, the tyre cord is exposed to a high temperature for a given time under a given tension and then cooled under the same tension (referred to as process "A").

The tyre cord is heat treated in an oven substituted with nitrogen under a tension at a high temperature for 60 minutes (referred to as process "B").

The tyre cord is wet heat treated at a high temperature under a given tension for a given time and then dry heat treated at a high temperature under a tension for a given time (referred to as process "C").

According to the process A, satisfactory improvement can not be obtained. According to the process B, an apparatus for substituting with nitrogen is necessary and further a treatment for a long time, such as 60 minutes is effected, so that this process is not preferable in the cost. According to the process C, a particular apparatus is necessary for the wet heat treatment.

An object of the present invention is to provide an excellent method for heat treating polyamide fibers, by which fibers having high stabilities against heat and stress are obtained by means of an ordinarily used heat treating apparatus.

Another object of the present invention is to provide a method for heat treating polyamide fibers for obtaining elastic products, particularly, tyres having excellent uniformity and dimension stability.

The method for heat treating polyamide fibers according to the present invention is characterized in that a heat treatment under a tension, in which polyamide fibers are exposed to a high temperature for a given time under a high tension, and a heat treatment under a relaxation, in which polyamide fibers are exposed to a high temperature for a given time under a low tension, are carried out repeatedly in a plurality of times alternately.

In polyamide fibers, by the heat treatment under a relaxation, the structural unstable region is converted into the stable region, the crystal stability is improved and the molecule orientation lowers while by the heat treatment under a tension, the molecule orientation is improved and the crystal stability lowers. The present invention utilizes these facts and the heat treatment under a tension and the heat treament under a relaxation are carried out repeatedly alternately, whereby the decrease of strength can be suppressed to the minimum limit, the molecule orientation is fixed and the heat stability and the stress stability are improved.

The treating conditions in the heat treatment under a tension and in the heat treatment under a relaxation, that is, tension, temperature and treating time are determined by fibers, treating apparatus and a relation of mutual conditions but it is preferred that the temperature is 180 to 220° C. each treating time in the heat treatment under a tension and the heat treatment under a relaxation is within 36 seconds, the tension per denier is 0.60 to 1.59 g. in the heat treatment under a tension and is not more than 0.39 g. in the heat treatment under a relaxation. At a temperature of lower than 180° C., the effect of the alternate heat treatment is small, while at the temperature of higher than 220° C. the polymerization degree lowers and consequently the strength lowers.

When the tension per denier in the heat treatment under a tension is more than 1.5 g., the strength lowers, while in the tension of less than 0.60 g., the effect is poor. The number of times of the alternate heat treatments is at least 3, preferably, at least 5.

According to the present invention, a heat treating apparatus provided with an air furnace and a means for applying a tension can be used and a particular apparatus is not necessary and air can be used as the heat medium, accordingly the treatment can be made at a low cost. Furthermore, heat shrinking percentage S and creep G shown by the following formulae can be considerably decreased in samples effected by a plurality of the alternate heat treatments as compared with samples effected one time of the alternate heat treatment. As the result, it is possible to obtain elastic products, particularly tyre having excellent uniformity and dimension stability.

The above described creep G was determined in accordance with the following Formula 1.

A sample tyre cord was applied a load of 0.004 g. per denier at a temperature of 24° C. under atmosphere of a relative humidity of 65% and the length (Lo) was determined. Thereafter, the tyre cord was left to stand and heated under atmospheric pressure at 175° C. for 30 minutes to cause a heat shrinkage sufficiently and then applied a load of 0.8 g. per denier at a temperature of 24° C. under atmosphere of a relative humidity of 65% for 5 minutes, after which the length (L) was determined $$G(\%) = \frac{L - Lo}{Lo} \times 100 \quad (1)$$

The above described heat shrinking percentage S was determined in accordance with the following Formula 2.

As sample tyre cord was applied a load of 0.004 g. per denier at a temperature of 24° C. under atmosphere of a relative humidity of 65% and the length (Lo) was determined. Thereafter, the tyre cord was left to stand at 177° C. for 30 minutes, after which the length (L) was determined.

$$S(\%) = \frac{Lo - L}{Lo} \times 100 \quad (2)$$

The following examples are given in illustration of this invention and are not intended as limitations thereof.

Figure 3:
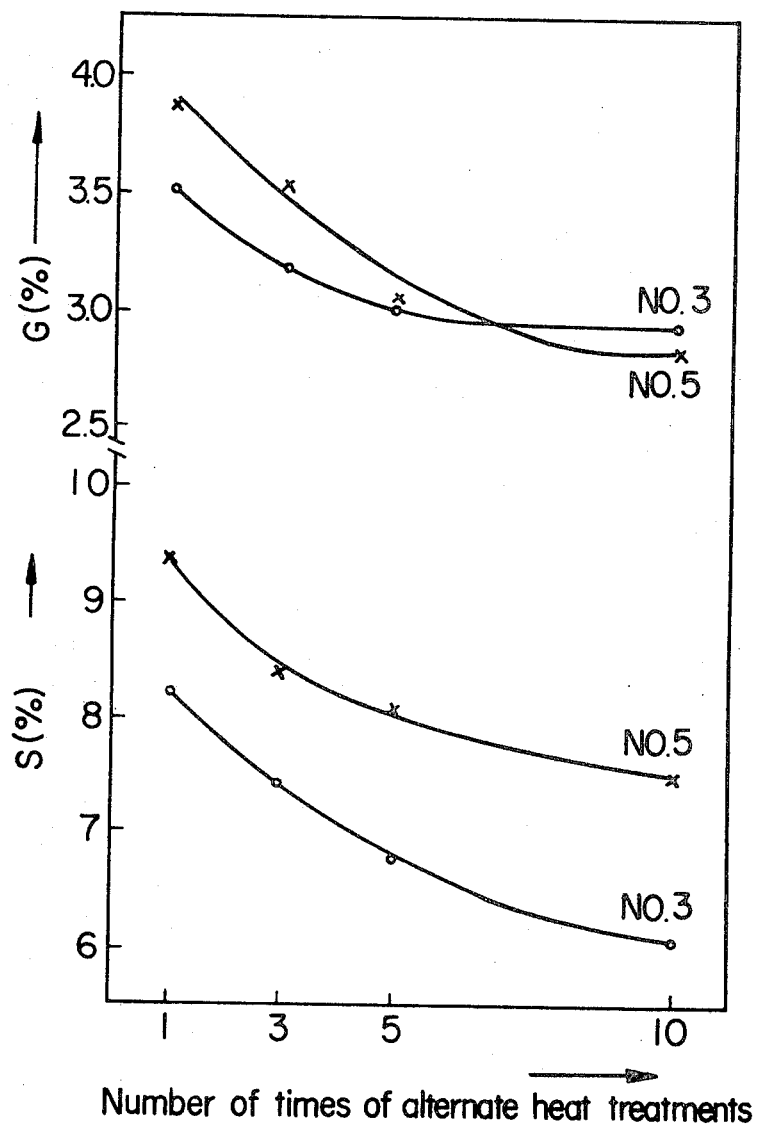
Figure 2:
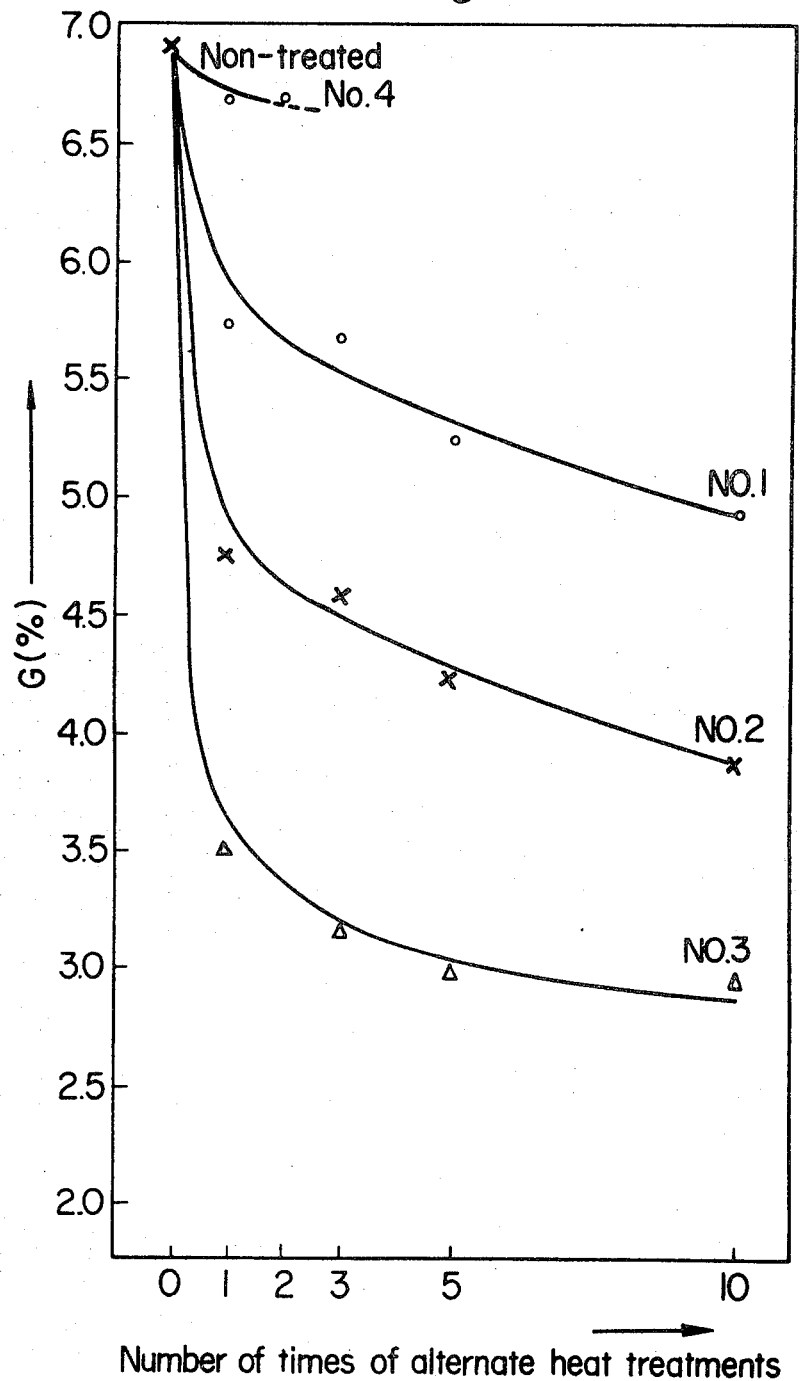

For a better understanding of the invention, reference is taken to the accompanying drawings, wherein:

FIGS. 1 and 2 are curves showing relations of the heat shrinking percentage and the creep to the number of times of the alternate heat treatments under various treating conditions in the heat treatment of the present invention respectively, and FIG. 3 is curves showing relations of the heat shrinking percentage and the creep to the number of times of the alternate heat treatments in two heat treatments in which the tensions in the heat treatment under a tension are different.

EXAMPLE 1

Tests were made with respect to nylon-6 tyre cords by changing the heat treating conditions and the number of times of the alternate heat treatments variously and the heat shrinking percentage S and the creep G were determined to obtain the results as shown in the following Table 1 and FIGS. 1 and 2. Furthermore, for the comparison with the present invention, tests were made with respect to conventional process in which only a heat treatment under a tension was carried out.

As seen from Table 1 and FIGS. 1 and 2, when the heat treatments are carried out by varying the temperature from 180° C. to 230° C. and keeping the load and treating time of the heat treatments at constant values, the heat shrinking percentage S shows better results at the higher temperature within the temperature range of 180° C. to 220° C. However, at a high temperature of 230° C., breakage readily occurs under this condition. Creep G obtains better result at the higher temperature within the temperature range of 180° C. to 220° C. but at a high temperature of 230° C., breakage occurs and good results can not be obtained.

TABLE 1

| Experiment Number | 1 | | | 2 | | | 3 | | | 4 | | | Comparative 1 | | | Comparative 2 | Non-treated |
|---|---|---|---|---|---|---|---|---|---|---|---|---|---|---|---|---|---|
| Treating condition: Heat treatment under tension | 180° C. × 4 kg. × 36 sec. | | | 200° C. × 4 kg. × 36 sec. | | | 220° C. × 4 kg. × 36 sec. | | | 230° C. × 4 kg. × 36 sec. | | | 200° C. × 4 kg. × time | | | | |
| Treating condition: Heat treatment under relaxation | 180° C. × 1 kg. × 36 sec. | | | 200° C. × 1 kg. × 36 sec. | | | 220° C. × 1 kg. × 36 sec. | | | 230° C. × 1 kg. × 36 sec. | | | | | | | |
| Number of times of alternate heat treatments | 1 | 5 | 10 | 1 | 5 | 10 | 1 | 5 | 10 | 1 | 2 | 3 | 1 172 | 1 216 | 1 360 | 1 720 | |
| Heat shrinking: | | | | | | | | | | | | | | | | | |
| Percentage S (percent) | 14.35 | 13.70 | 13.00 | 10.95 | 10.65 | 10.15 | 8.20 | 7.45 | 6.78 | 6.07 | 4.19 | 4.78 | 15.20 | 15.01 | 14.83 | 13.52 | 15.80 |
| Creep G (percent) | 5.72 | 5.22 | 4.91 | 4.75 | 4.58 | 4.25 | 3.50 | 3.15 | 2.98 | 2.92 | 6.68 | 6.68 | 5.28 | 5.32 | 5.27 | 4.7 | 6.86 |

[1] Seconds.
NOTE: 1. Nylon tyre cord: 1,260 denier ×2; 2. Tension: per one cord; 3. *: breakage.

EXAMPLE 2

Nylon-6 tyre cord was heat treated by applying tensions of 4 kg. and 3 kg. in the heat treatment under a tension and 1 kg. in the heat treatment under a relaxation and the heat shrinking percentage and the creep were determined and the obtained results are shown in Table 2 and FIG. 3.

TABLE 2

| | Experiment Number | | | | | | | |
|---|---|---|---|---|---|---|---|---|
| | 3 | | | | 4 | | | |
| Treating condition: heat treatment under tension | 220° C. x 4 kg. x 36 sec. | | | | 220° C. x 3 kg. x 36 sec. | | | |
| Treating condition: heat treatment under relaxation | 220° C. x 1 kg. x 36 sec. | | | | 220° C. x 1 kg. x 36 sec. | | | |
| Number of times of alternate heat treatments | 1 | 3 | 5 | 10 | 1 | 3 | 5 | 10 |
| Heat shrinking: | | | | | | | | |
| Percentage S (percent) | 8.20 | 7.45 | 6.78 | 6.07 | 9.35 | 8.40 | 8.05 | 7.50 |
| Creep G (percent) | 3.50 | 3.15 | 2.98 | 2.92 | 3.87 | 3.52 | 3.03 | 2.81 |

As seen from Table 2 and FIG. 3, as the number of times of the alternate heat treatments increases, the heat shrinking percentage and the creep are smaller and the stabilization is better. Furthermore, the heat shrinking percentage and the creep are better in Experiment No. 3 wherein the load in the heat treatment under a tension is larger, than in Experiment No. 5.

What is claimed is:

1. A method for heat treating polyamide fibers comprising
    subjecting said fibers to a heat treatment under a tension at a temperature of about 180° C. to about 220° C. within 36 seconds under a tension per denier of 0.60 to 1.59 g. and
    a heat treatment under a relaxation at a temperature of about 180° C. to about 220° C. within 36 seconds under a tension per denier of not more than 0.39 g. alternately repeatedly at least five times.

References Cited

UNITED STATES PATENTS

| | | | |
|---|---|---|---|
| 2,615,784 | 10/1952 | McClellan | 8—130.1 |
| 2,807,863 | 10/1957 | Schenker | 264—290 N |
| 2,844,488 | 7/1958 | Meberg et al. | 117—7 |
| 2,932,078 | 4/1966 | Wilson | 117—7 |
| 3,220,060 | 11/1965 | Agett | 28—72.1 |
| 3,307,962 | 3/1967 | Hardy | 117—7 |
| 3,527,862 | 9/1970 | Shimosako et al. | 264—342 RE |
| 3,546,329 | 12/1970 | Hirono et al. | 264—235 |
| 3,553,307 | 1/1971 | Kovac et al. | 264—342 RE |
| 3,562,382 | 2/1971 | Fowler | 264—290 N |

JAY H. WOO, Primary Examiner

U.S. Cl. X.R.

28—72, 17; 264—235, 346